Figure 1:
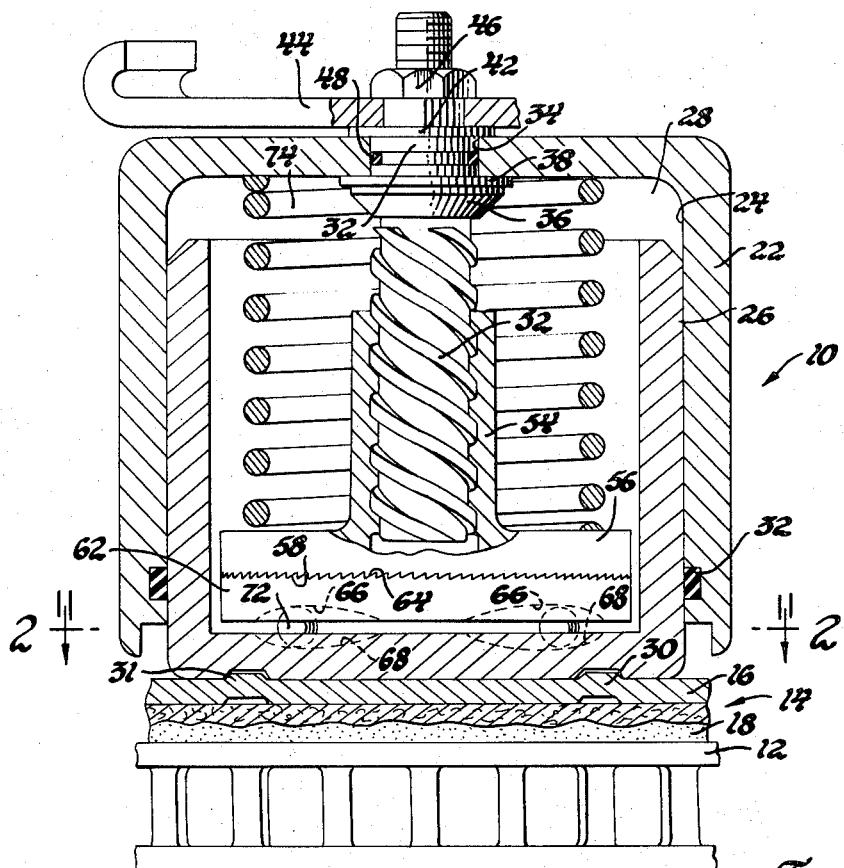

United States Patent [19]
Hurt

[11] 3,820,635
[45] June 28, 1974

[54] SELF ADJUSTING DISC BRAKE WITH PARKING BRAKE

[75] Inventor: Harmon C. Hurt, Dayton, Ohio

[73] Assignee: General Motors Corporation, Detroit, Mich.

[22] Filed: July 23, 1973

[21] Appl. No.: 381,370

[52] U.S. Cl............ 188/71.9, 188/72.6, 188/196 F, 192/11 A
[51] Int. Cl............................................. F16d 65/56
[58] Field of Search............ 188/72.6, 106 F, 71.8, 188/71.9, 72.8, 196 B, 196 BA, 196 F, 196 D; 192/111 A, 93 A, 20.23, 20.25

[56] References Cited
UNITED STATES PATENTS
| 3,442,357 | 5/1969 | Farr | 188/196 D |
|---|---|---|---|
| 3,653,470 | 4/1972 | Travis | 188/71.9 |

FOREIGN PATENTS OR APPLICATIONS
| 1,028,649 | 5/1966 | Great Britain | 188/71.9 |

Primary Examiner—George E. A. Halvosa
Attorney, Agent, or Firm—D. D. McGraw

[57] ABSTRACT

Mechanical actuating means for a disc brake caliper includes a shaft rotatably journalled in the housing and having a threaded portion which threadedly engages a nut having integral circular plate. A second circular plate is interposed between the integral plate of the nut and the conventional hydraulic actuating piston. A one-way clutch is provided by ratchet teeth on the adjacent faces of the integral plate and second plate. A ball and ramp arrangement is provided between the second plate and the piston. Rotation of the shaft in one direction causes the nut to rotate therewith and the ratchet teeth to rotate the second plate which in turn causes the ball and ramp arrangement to move the piston axially to carry the brake shoe into engagement with the disc. Upon return of the shaft to its preactuation rotational position clearance will result in the mechanical actuating mechanism to an extent corresponding to the lining wear encountered. A spring causes the nut to rotate on the shaft in the direction axially toward the disc as permitted by ratcheting of the one-way clutch so that the effective length of the mechanical actuating mechanism is extended to adjust for the wear. Wear adjustment also occurs upon hydraulic actuation of the brake.

3 Claims, 2 Drawing Figures

PATENTED JUN 28 1974 3,820,635

SELF ADJUSTING DISC BRAKE WITH PARKING BRAKE

The invention relates to a disc brake caliper assembly and more particularly to a combination mechanical and hydraulic actuating means and wear adjusting means for a disc brake caliper.

It is desirable in an automotive disc brake assembly to provide hydraulic brake actuation for service braking and mechanical brake actuation for emergency and parking braking. It is also desirable to provide an automatic wear adjustment mechanism which takes up slack in the actuating means so that the vehicle operator can attain a consistent degree of actuation of the brake system regardless of the extent to which the brake linings have worn.

The disc brake of this invention includes a caliper having a bore therein and a piston sealingly slidable in the bore to carry the brake shoe assembly into frictional engagement with the disc when hydraulic pressure is applied thereto. A shaft is rotatably journalled in the housing and has a threaded portion extending into the bore of the housing. A nut threadedly engaged on the threaded portion of the shaft has an integral circular plate. A second circular plate is interposed between the integral plate of the nut and the piston. A ball and ramp arrangement is provided between the second plate and the piston to impart axial movement to the piston when the second plate is rotated. A one-way clutch is provided between the second plate and the integral plate of the nut and is comprised of ratchet teeth on the adjacent faces of the plates. When the shaft is rotated in one direction by a conventional parking brake apply mechanism, the nut rotates with the shaft and the ratchet teeth cause the plate to rotate therewith so that the ball ramp arrangement moves the piston axially to carry the brake shoe into engagement of the disc. Release of the parking brake control mechanism permits these elements to return to their preactuation rotational and axial positions. In the event that lining wear has occurred, the piston will not return to its preactuation axial position within the bore due to the friction between the piston and the bore of the housing. A spring acts between the housing and the nut to cause the nut to rotate on the threaded portion of the shaft in the direction axially toward the disc. This rotation of the integral plate of the nut relative the second plate causes the ratchet teeth of the integral plate to ratchet over the teeth of the second plate so that the nut will have moved irreversibly toward the disc to extend the effective length of the mechanical actuating mechanism.

Figure 2:
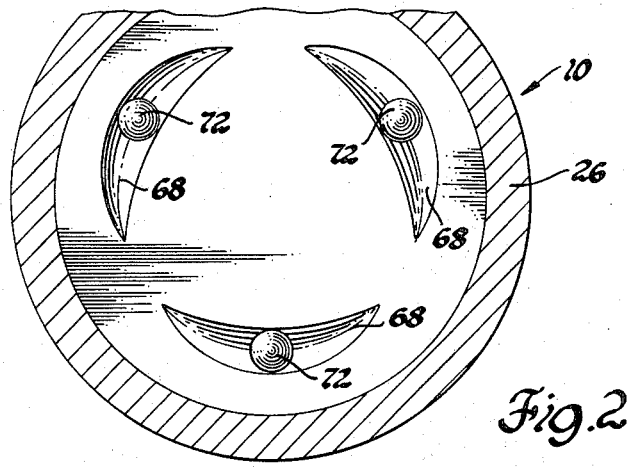

In the drawings:

FIG. 1 is a cross section view of the disc brake caliper assembly having parts broken away in a section; and FIG. 2 is a sectional view taken in the directions of arrows 2—2 of FIG. 1.

The disc brake assembly includes a caliper assembly, indicated generally at 10, and a rotor 12 which is attached to the vehicle wheel for rotation therewith. A brake shoe assembly indicated generally at 14 includes a backing plate 16 having a friction lining 18 bonded thereto. A like brake shoe assembly, not shown, is situated on the opposite side of the rotor 12. The caliper assembly 10 includes a housing 22 having a leg not shown which spans the periphery of the rotor 12 and is attached to the brake shoe which is not shown. The housing 22 has a bore 24 in which a hollow piston 26 is axially slidable. The piston 26 is fixed against rotation relative to the housing 22 as for example by tangs 30 and 31 of the backing plate 16 which protrude into mating depressions in the face of the piston 26. The piston 26 forms with the bore 24 of housing 22 an expansible chamber 28. A seal 32 is located between the piston 26 and the housing 22. It will be apparent that when pressurized fluid is communicated to the expansible chamber 28, the piston 26 is moved forcibly to carry brake shoe 14 into frictional engagement of the disc 12 and the reaction force transferred through the caliper housing 22 moves the brake shoe on the other side of the disc into frictional engagement of the disc.

The mechanical brake actuating means and wear adjuster includes a shaft 32 rotatably journalled in a bore 34 of the housing 22. The shaft 32 has a shoulder 36 which engages a thrust washer 38 interposed between the shoulder 36 and housing 22. A similar thrust washer 42 is interposed between the housing 22 and a lever 44 attached to the threaded outer end of shaft 32 by a nut 46. Thus it will be seen that the shaft 32 is rotatable relative the housing 22 upon rotation of the lever 44 which is connected to a conventional emergency and parking brake control mechanism. A pressure seal 48 prevents fluid leakage between the bore 34 and shaft 32.

Shaft 32 has a threaded portion 52 having a high lead thread. A nut 54 has a like thread and is thereby threadedly engaged on the threaded portion 52 of the shaft 32. The nut 54 has an integral circular plate 56 having on the face thereof ratchet teeth 58 including alternating axially extending and ramped surfaces. A second circular plate 62 is located adjacent the integral plate 56 of nut 54 and has ratchet teeth 64 formed thereon and mating with the ratchet teeth 58 of nut 54 to provide a one-way clutch connection between the nut 54 and plate 62.

The plate 62 is in turn connected to the piston 26 by a ball and ramp connection. The face of plate 62 and the adjacent wall of piston 26 have aligned crescent shaped grooves or ramped depressions 66 and 68 as best seen in FIG. 2. Rolling bodies or balls 72 are located in each of the paired crescent shaped grooves 66 and 68. The crescent shaped grooves and balls are preferably of at least three in number and equally circumferentially spaced as seen in FIG. 2. It will be apparent that upon rotary movement of the plate 62 relative piston 26, the plate 62 and piston 26 will be moved axially relative one another.

An adjusting spring 74 acts between housing 22 and the nut 54 to hold the nut 54, the plate 62, balls 72, and piston 26 in contact with one another in the normal position as seen in FIG. 1.

Actuation of the parking brake is by rotation of lever 44 and the shaft 32 in the clockwise direction as viewed in the direction of arrows 2—2. Such rotation of the axially stationary shaft 32 urges nut 54 axially toward the disc resulting in such a frictional force between threaded portion 52 and nut 54 that the nut 54 rotates with the shaft 32. The plate 62 is in turn rotated therewith through the engagement of the axially extending surfaces of the mating ratchet teeth 58 and 64 as seen in FIG. 1. Rotation of plate 62 causes the balls 72 to ride up the surfaces of the crescent shaped grooves 66 and 68 and accordingly forces piston 26 axially outwardly toward the rotor 12 to forcibly carry friction shoe 14 into braking engagement of the disc 12. Upon release of the parking brake, the lever 44 and shaft 32 are returned to their initial rotary position and the nut 54 and plate 62 likewise return to their original rotary positions allowing piston 26 to return axially to its preactuation axial position within the housing 22.

In the event of brake lining wear during this mechanical actuation, the piston 26 will not return into the housing 22 to the extent of its original axial position therein. Since the lever 44 and shaft 32 are returned to their preactuation rotary positions and act to carry the nut 54 to its preactuation rotary and axial position within the housing 22, it will be seen that a clearance will develop within the mechanical actuating mechanism to an extent corresponding to the lining wear. Spring 74 acting on the plate 56 of nut 54 rotates nut 54 counterclockwise on the shaft 32 as viewed in the direction of arrows 2—2 so that the inclined surfaces of the ratchet teeth 58 climb up the inclined surfaces of ratchet teeth 64. When the lining wear accumulates sufficiently, the teeth 58 will ratchet over teeth 64. When this occurs, it will be apparent that the nut 54 will have moved irreversibly axially toward the disc to extend the effective length of the mechanical actuating mechanism. Inasmuch as the ratchet teeth are of relatively small pitch, for example 12 thousands of an inch high along the axially extending surface and 20 thousands of an inch along the ramped surface, it will be apparent that adjustment will be provided for small increments of lining wear.

During hydraulic actuation of the brake, fluid pressure is communicated to the expansible chamber 28 and forcibly moves the piston 26 to carry the brake shoe 14 into frictional engagement of the disc. As the brake linings wear, spring 74 rotates nut 54 counterclockwise on the shaft 52 causing the inclined surfaces of the ratchet teeth 58 to climb the inclined surfaces of the ratchet teeth 64. When the lining wear accumulates sufficiently, the teeth 58 will ratchet over the teeth 64 to extend the effective length of mechanical actuating mechanism.

Thus it is seen that an improved self-adjusting disc brake with parking brake is provided.

What is claimed is:

1. A combination hydraulic actuating means, mechanical actuating means, and self-adjusting means for a disc brake assembly having a disc and a brake shoe assembly and comprising: a housing having a bore therein; a piston sealingly slidable in the bore and engaging the brake shoe assembly, said piston being advanceable to carry the brake shoe assembly into engagement with the disc; means preventing rotation of the piston in the housing; a shaft rotatably journalled in the housing and having a threaded portion extending into the bore; a nut threadedly engaged on the threaded portion of the shaft; a plate interposed between the nut and the piston; means acting between the plate and the piston to impart axial movement to the piston upon rotary movement of the plate; one-way clutch means effective between the plate and the nut to rotate the plate when the nut is rotated in one direction; the threaded engagement of the nut and shaft acting to rotate the nut in the one direction when the shaft is rotated in the one direction so that the means acting between the plate and piston acts to move the brake shoe assembly into frictional engagement with the disc; and spring means acting on the nut to rotate the nut in the other direction on the threaded portion of the shaft and toward the disc to adjust for brake shoe wear as permitted by the one-way clutch.

2. A combination hydraulic actuating means, mechanical actuating means, and self-adjusting means for a disc brake assembly having a disc and a brake shoe assembly and comprising: a housing having a bore therein; a piston sealingly slidable in the bore and engaging the brake shoe assembly, said piston being advanceable to carry the brake shoe assembly into engagement with the disc; means preventing rotation of the piston in the housing; a shaft rotatably journalled in the housing and having a threaded portion extending into the bore; a nut threadedly engaged on the threaded portion of the shaft and having an integral plate, said plate having ratchet teeth including alternate axially extending and ramped surfaces on the face thereof facing toward the disc; a second plate interposed between the nut and the piston and having ratchet teeth mating the ratchet teeth of the nut; ball and ramp means acting between the plate and the piston to impart axial movement to the piston upon rotary movement of the second plate; the threaded engagement of the nut and shaft acting to rotate the nut in one direction when the shaft is rotated in the one direction and rotating the second plate by driving engagement of the axially extending surfaces so that the ball and ramp means acting between the second plate and piston acts to move the brake shoe assembly into frictional engagement with the disc; and spring means acting on the nut to rotate the nut in the other direction on the threaded portion of the shaft and axially toward the disc to adjust for wear as permitted by the ramped surfaces of the nut ratchet teeth riding up the ramped surfaces of the second plate ratchet teeth.

3. A combination hydraulic actuating means, mechanical actuating means, and self-adjusting means for a disc brake assembly having a disc and a brake shoe assembly and comprising: a housing having a bore therein; a piston sealingly slidable in the bore and engaging the brake shoe assembly, said piston being advanceable to carry the brake shoe assembly into engagement with the disc; means preventing rotation of the piston in the housing; a shaft rotatably journalled in the housing and having a threaded portion extending into the bore; a nut threadedly engaged on the threaded portion of the shaft; a plate interposed between the nut and the piston; the plate and piston having paired ramped depressions in their adjacent faces; a rolling body seated in each pair of ramped depressions and effective to impart axial movement to the piston upon rotary movement of the plate; one-way clutch means effective between the plate and the nut to rotate the plate when the nut is rotated in one direction and permit rotation of the nut relative the plate in the other direction; the threaded engagement of the nut and shaft acting to rotate the nut in the one direction when the shaft is rotated in the one direction so that the one-way clutch rotates the plate and cooperation of the rolling bodies and ramped depressions moves the piston to carry the brake shoe assembly into frictional engagement with the disc; and spring means acting on the nut to rotate the nut in the other direction on the threaded portion of the shaft and toward the disc to irreversibly extend the effective length of the mechanical actuating means and thereby adjust for brake shoe wear.

* * * * *